(12) United States Patent
Iwayama

(10) Patent No.: US 11,638,996 B2
(45) Date of Patent: May 2, 2023

(54) ROBOT

(71) Applicant: FANUC CORPORATION, Yamanashi (JP)

(72) Inventor: Takatoshi Iwayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 209 days.

(21) Appl. No.: 16/892,758

(22) Filed: Jun. 4, 2020

(65) Prior Publication Data

US 2021/0016447 A1     Jan. 21, 2021

(30) Foreign Application Priority Data

Jul. 19, 2019    (JP) .............................. JP2019-133203

(51) Int. Cl.
     *B25J 9/16*           (2006.01)
     *B25J 17/02*          (2006.01)

(52) U.S. Cl.
     CPC .............. *B25J 9/1694* (2013.01); *B25J 17/02* (2013.01)

(58) Field of Classification Search
     CPC ........ B25J 9/1694; B25J 17/02; B25J 9/1676; B25J 19/02; B25J 13/086; B25J 18/00; B25J 17/00; B25J 19/021; B25J 9/0009; B25J 9/04; B25J 9/1602; B25J 19/063; B25J 13/084; B25J 13/08; B25J 19/027; G05B 2219/40544; G05B 2219/40614; G05B 2219/40219; G05B 2219/37277; G05B 2219/37279; G05B 2219/37284; A61B 2562/0257

See application file for complete search history.

(56) References Cited

U.S. PATENT DOCUMENTS

| | | | |
|---|---|---|---|
| 2013/0325181 A1* | 12/2013 | Moore | B25J 13/086 901/31 |
| 2018/0236667 A1* | 8/2018 | Gombert | H03K 17/955 |
| 2019/0033481 A1 | 1/2019 | Iida | |
| 2019/0070730 A1 | 3/2019 | Morioka et al. | |
| 2019/0193267 A1* | 6/2019 | Peng | B25J 9/1664 |
| 2019/0366544 A1* | 12/2019 | Oka | B25J 9/1694 |
| 2020/0171662 A1 | 6/2020 | Morioka | |

FOREIGN PATENT DOCUMENTS

| | | |
|---|---|---|
| JP | S60233706 A | 11/1985 |
| JP | H06-278081 A | 10/1994 |
| JP | 2003-071778 A | 3/2003 |
| JP | 2006247803 A | 9/2006 |
| JP | 2009-072883 A | 4/2009 |

(Continued)

*Primary Examiner* — Abby Y Lin
*Assistant Examiner* — Esvinder Singh
(74) *Attorney, Agent, or Firm* — Maier & Maier, PLLC

(57) ABSTRACT

A robot including: a robot body that includes an arm having a longitudinal axis, and at least one joint; and a proximity sensor unit that detects an object approaching the arm of the robot body. The proximity sensor unit includes: a support member that is fixed to the arm of the robot body and that is disposed, at such a position as to extend across the joint of the robot body, so as to be away from a surface of the arm in a direction perpendicular to the longitudinal axis of the arm; and a plurality of proximity sensors that are attached to the support member.

8 Claims, 10 Drawing Sheets

(56) References Cited

FOREIGN PATENT DOCUMENTS

| JP | 2010-010116 A | 1/2010 |
| JP | 2015-014950 A | 1/2015 |
| JP | 2018103345 A | 7/2018 |
| JP | 2019-042907 A | 3/2019 |
| JP | 2020-082318 A | 6/2020 |
| WO | 2017/170305 A1 | 10/2017 |

\* cited by examiner

ROBOT

CROSS-REFERENCE TO RELATED APPLICATIONS

This application is based on Japanese Patent Application No. 2019-133203, the contents of which are incorporated herein by reference.

FIELD

The present disclosure relates to a robot.

BACKGROUND

There is a known robot that includes, at such a position as to surround an arm in the circumferential direction, a cylindrical proximity sensor for detecting an object approaching from the outside (for example, see Japanese Unexamined Patent Application, Publication No. 2010-10116).

SUMMARY

According to one aspect, the present disclosure provides a robot including: a robot body that includes an arm having a longitudinal axis and at least one joint; and a proximity sensor unit that detects an object approaching the arm of the robot body, wherein the proximity sensor unit includes a support member that is fixed to the arm and that is disposed, at such a position as to extend across the joint, so as to be away from a surface of the arm in a direction perpendicular to the longitudinal axis, and a plurality of proximity sensors that are attached to the support member.

DETAILED DESCRIPTION OF EMBODIMENTS

Figure 1:
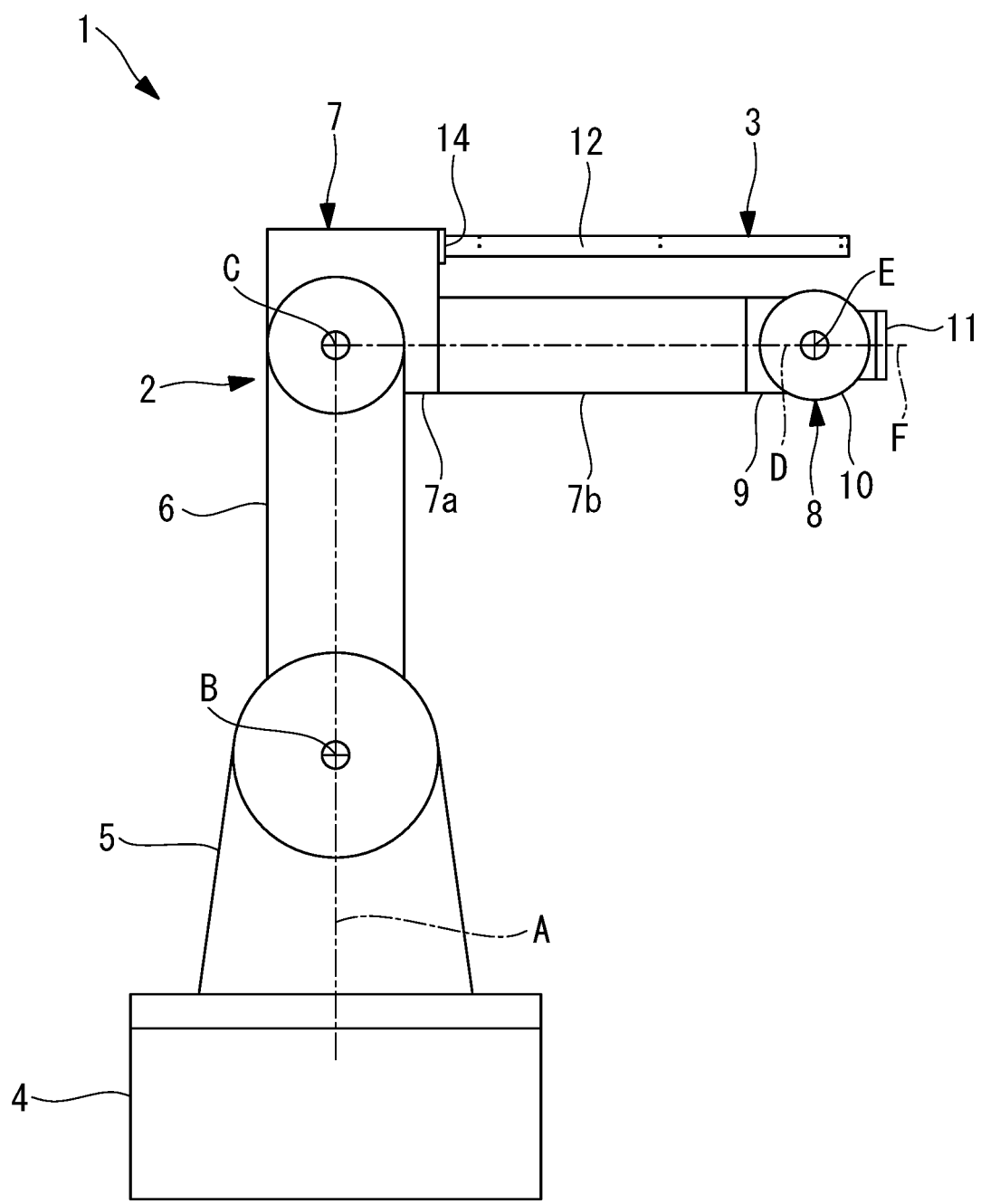
FIG. 1 is a side view showing a robot that includes a control device according to one embodiment of the present disclosure.

A robot 1 according to one embodiment of the present disclosure will be described below with reference to the drawings. The robot 1 of this embodiment includes a robot body 2 and a proximity sensor unit 3.

In examples shown in the drawings, the robot body 2 is a six-axis vertical articulated type robot. The robot 1 is not limited to this type and may also be a robot of an arbitrary type, such as a robot of a vertical articulated type or horizontal articulated type having a number of axes other than 6.

The robot body 2 includes: a base 4 that is installed on the floor surface; a swivel body 5 that is supported so as to be rotatable about a vertical first axis A with respect to the base 4; and a first arm 6 that is supported so as to be rotatable about a horizontal second axis B with respect to the swivel body 5. The robot body 2 includes: a second arm (arm) 7 that is supported, at a distal end of the first arm 6, so as to be rotatable about a horizontal third axis C; and a 3-axis wrist unit 8 that is supported at a distal end of the second arm 7.

The wrist unit 8 includes: a first wrist element 9 that is supported so as to be rotatable about a fourth axis D aligned with the central axis of the second arm 7; and a second wrist element 10 that is supported so as to be rotatable about a fifth axis E perpendicular to the fourth axis D, with respect to the first wrist element 9. The wrist unit 8 includes a third wrist element 11 supported so as to be rotatable with respect to the second wrist element 10 about a sixth axis F that intersects the fourth axis D and the fifth axis E at one point.

Figure 2:
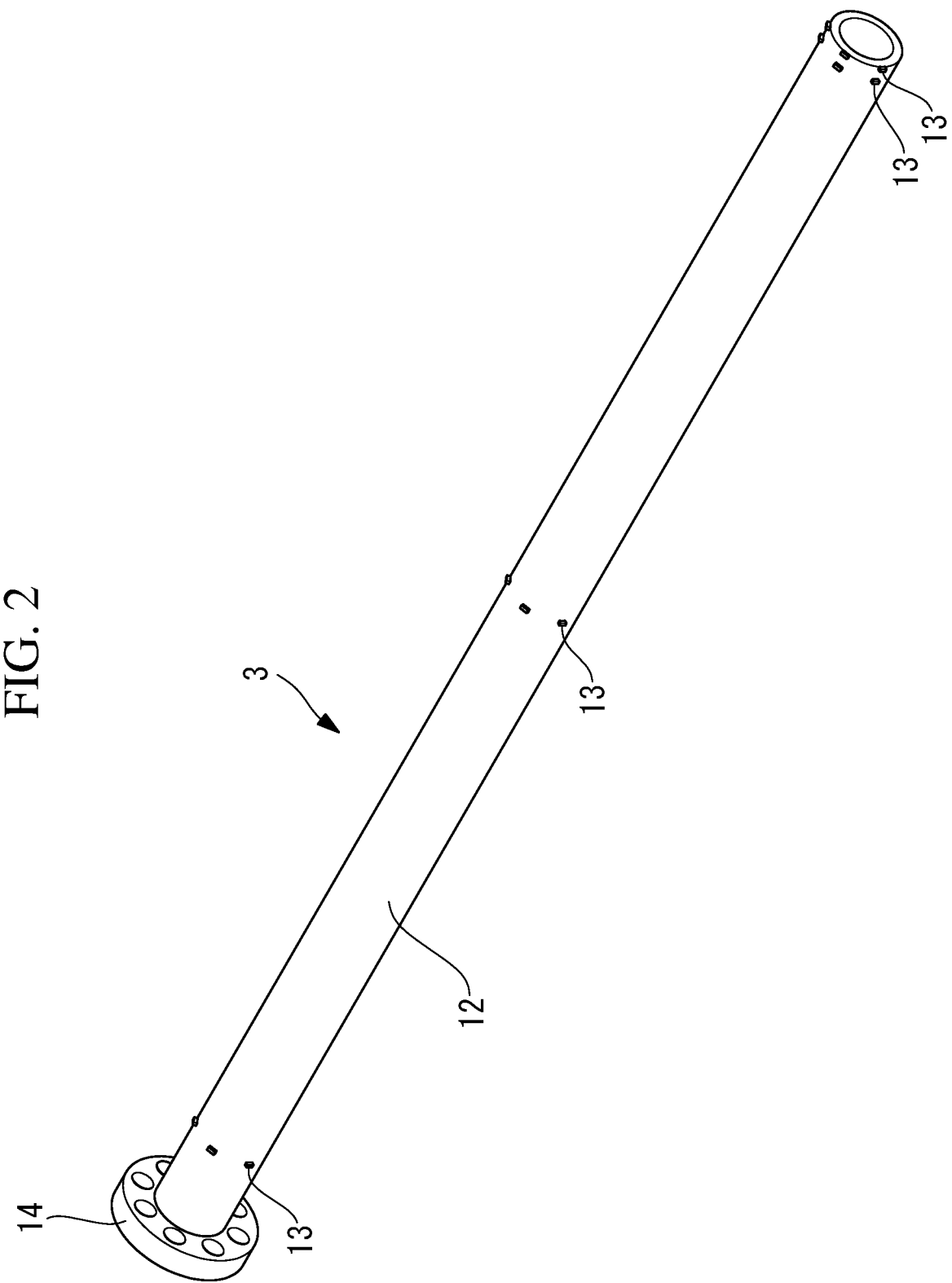
FIG. 2 is a perspective view showing a proximity sensor unit included in the robot shown in FIG. 1.
Figure 3:
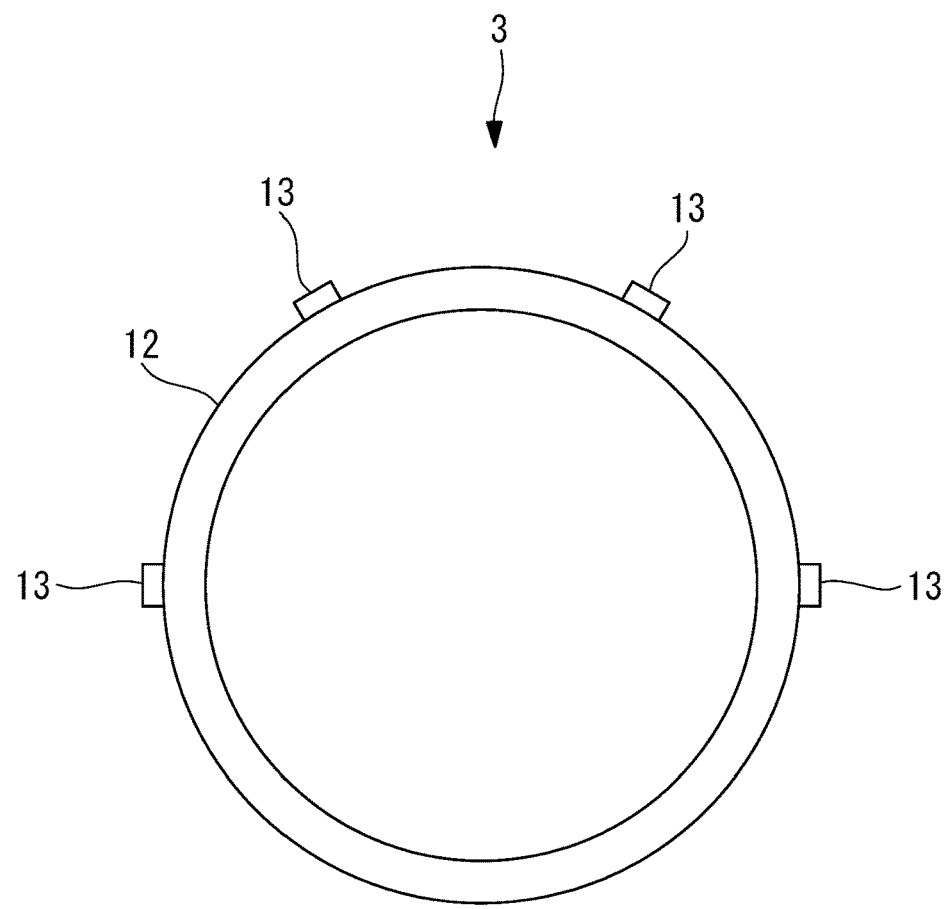
FIG. 3 is a sectional view of the proximity sensor unit shown in FIG. 2.

As shown in FIGS. 1 to 3, the proximity sensor unit 3 includes a cylindrical support member 12 and a plurality of proximity sensors 13 that are provided at intervals in the axial direction and the circumferential direction of the support member 12. The support member 12 is made of an arbitrary material, such as metal or resin, and is formed to be lightweight and to have high rigidity. Reference sign 14 denotes a flange used to attach the support member 12 to the robot body 2.

As shown in FIG. 3, the proximity sensors 13 are disposed at four places on one half circumference section in a cross section of the support member 12, at intervals of 60 degrees in the circumferential direction. In a state in which the proximity sensor unit 3 is attached to the robot body 2, the half circumference section on which the proximity sensors 13 are disposed is located on the opposite side from the robot body 2.

Figure 4:
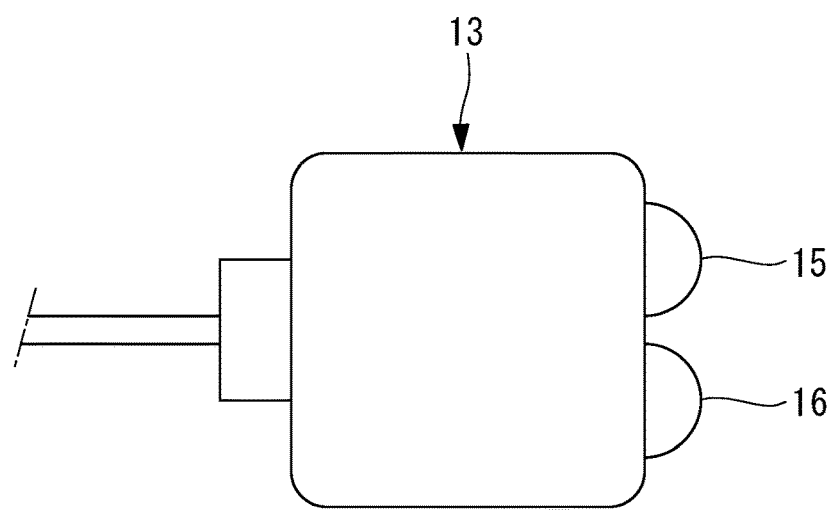
FIG. 4 is a view showing an example proximity sensor included in the proximity sensor unit shown in FIG. 2.

As shown in FIG. 4, for example, each of the proximity sensors 13 includes an emitter part 15 and a light receiving part 16. Each of the proximity sensors 13 is a TOF sensor in which, after light is emitted from the emitter part 15 and is reflected at an object, return light that returns from the object is detected by the light receiving part 16, thereby making it possible to measure the distance to the object on the basis of the time required from emission to detection.

Figure 5:
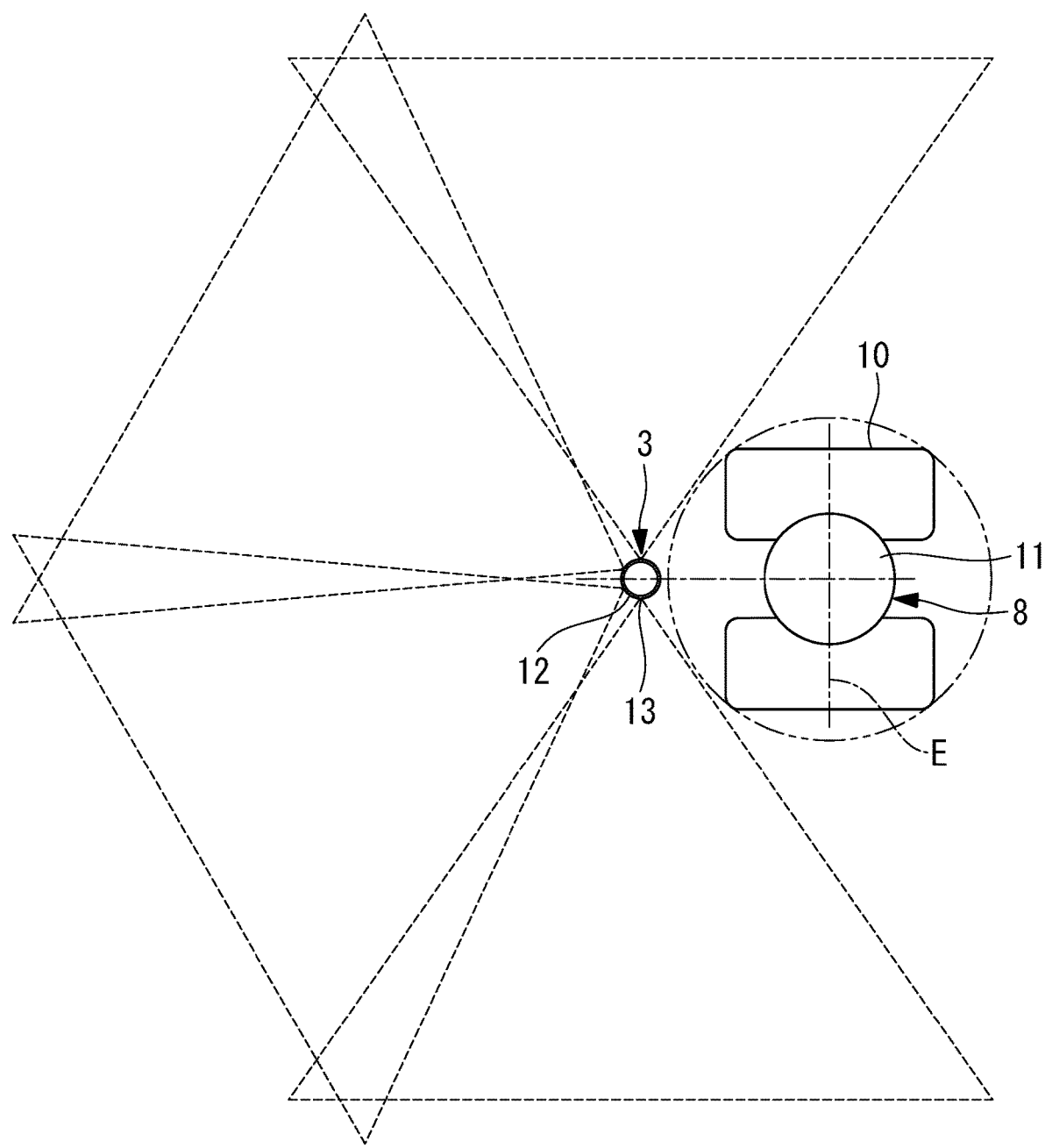
FIG. 5 is a front view for explaining detection ranges of proximity sensors in the robot shown in FIG. 1.
Figure 6:
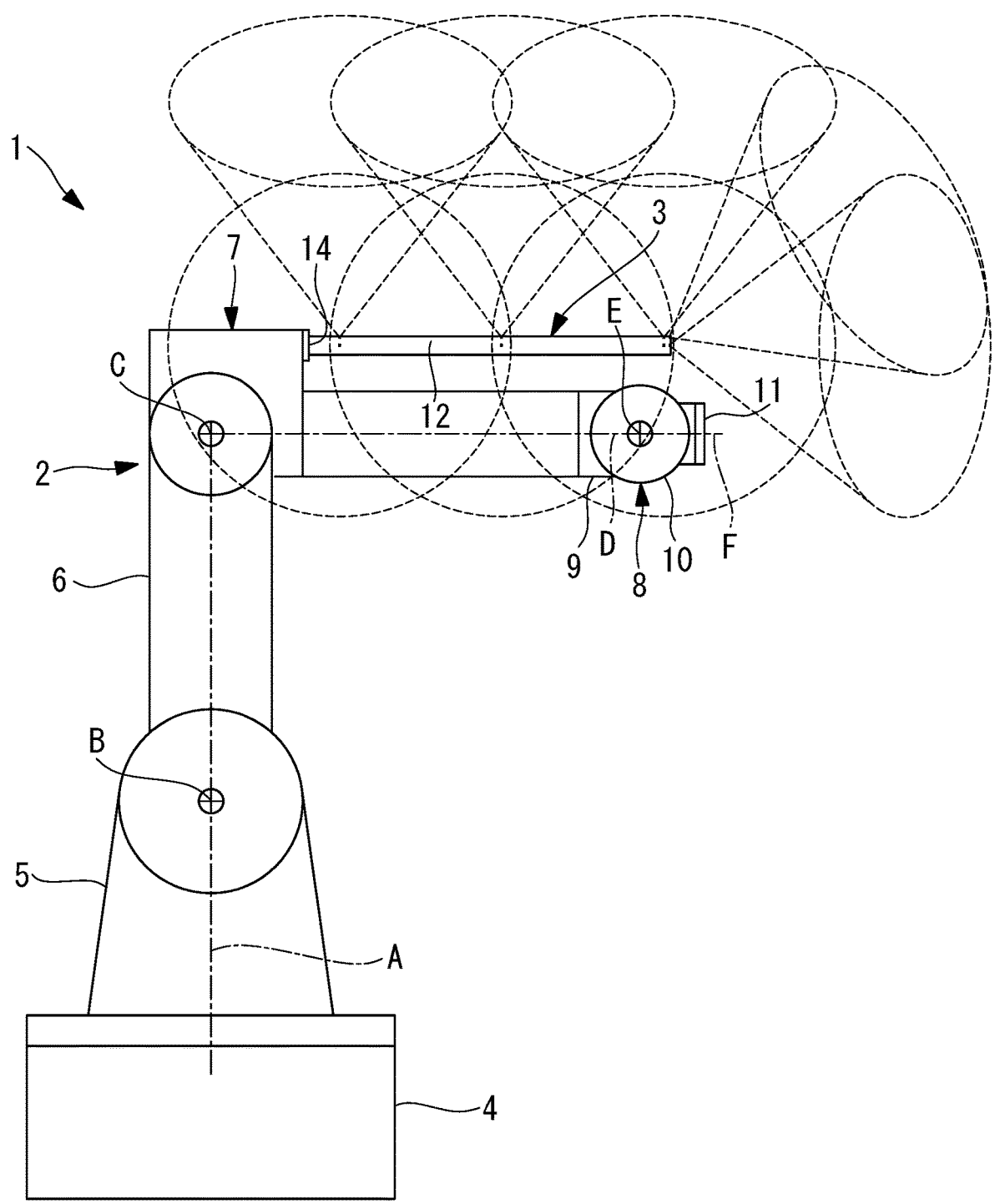
FIG. 6 is a side view for explaining the detection ranges of the proximity sensors in the robot shown in FIG. 1.

As shown in FIG. 5, each of the proximity sensors 13 has a substantially conical detection range that expands with increasing distance from the proximity sensor 13. The central axes of the substantially conical detection ranges of the proximity sensors 13 are located radially outward from the center of the support member 12. Accordingly, as shown in FIGS. 5 and 6, the detection ranges of the proximity sensors 13 that are adjacent in the circumferential direction and the axial direction of the support member 12 overlap one another, thereby making it possible to detect approaching objects, without any omission, over a wide range around the second arm 7 and the wrist unit 8.

In this embodiment, the proximity sensor unit 3 is attached to the robot body 2 by fixing one end of the support member 12 to a base end of the second arm 7. When the robot body 2 is in the posture at the origin position shown in FIG. 1, the support member 12 is disposed away from an upper surface of the second arm 7 at a position corresponding to an upper section of the second arm 7 so as to extend across the total length of the second arm 7 and the wrist unit 8. In the example shown in FIG. 1, the support member 12 is disposed so as to extend up to a position near a distal-end surface of the wrist unit 8 in such a posture as to allow the fourth axis D and the sixth axis F to be located in the same straight line.

The operation of the thus-configured robot 1 of this embodiment will be described below. According to the robot 1 of this embodiment, the proximity sensor unit 3 is actuated when the robot body 2 is operated, thereby making it possible to arrange the detection ranges of the plurality of proximity sensors 13 around the second arm 7 and the wrist unit 8.

Therefore, when the robot body 2 is operated in a state in which the proximity sensor unit 3 is actuated, at the time when a nearby object, for example, an operator or another machine, approaches the robot body 2 in accordance with the operation of the robot body 2 and enters any of the detection ranges, the object is detected by the corresponding proximity sensor 13. A detection signal obtained by the proximity sensor 13 is sent to a control device (not shown) connected to the robot body 2, and the control device reduces the operating speed of the robot body 2 or stops the robot body 2 on the basis of the sent detection signal. Alternatively, the approach of the nearby object is reported by a notification means (not shown). Accordingly, it is possible to avoid contact between the robot body 2 and the object.

In this embodiment, the support member 12 of the proximity sensor unit 3 is disposed at a position away from the surface of the second arm 7 and the surface of the wrist unit 8. Accordingly, regardless of the shapes of the second arm 7 and the wrist unit 8, it is possible to adopt, for the support member 12, a simple shape, such as a cylinder shape shown in FIG. 2. Because it is not necessary to adopt a shape conforming to the surface shapes of the second arm 7 and the wrist unit 8, the cost of the proximity sensor unit 3 can be reduced.

The support member 12 of the proximity sensor unit 3 is disposed away from the surface of the second arm 7 and the surface of the wrist unit 8. Accordingly, even with the support member 12, which has a simple structure, the detection ranges can be located over a wide range extending from the second arm 7 to the distal end of the wrist unit 8, the second arm 7 and the wrist unit 8 moving relative to each other.

Instead of using a single or a small number of proximity sensors 13 that each have a wide detection range, the plurality of proximity sensors 13 are disposed so as to be spaced apart from one another. Accordingly, it is possible to form a wide detection range having a shape conforming to the shapes of the second arm 7 and the wrist unit 8, while limiting the detection range of each of the proximity sensors 13 to improve the detection accuracy.

According to this embodiment, the plurality of proximity sensors 13, which are arranged at intervals, form the detection ranges without gaps therebetween. Accordingly, there is an advantage in that it is possible to prevent omission of detection of an approaching object and to prevent false detection by forming appropriately expanded detection ranges.

In this embodiment, the proximity sensors 13 are disposed on the half circumference section of the support member 12, which is disposed at the position corresponding to the upper section of the second arm 7 at the origin position, the half circumference section being located at the opposite side from the second arm 7. Accordingly, the detection ranges of the proximity sensors 13 are located over the upper surface and both side surfaces of each of the second arm 7 and the wrist unit 8. Therefore, when the robot body 2 is operated, an object that approaches the robot body 2 from the upper surface or the both side surfaces of the second arm 7 can be effectively detected.

Because a cylinder shape is adopted for the support member 12, wires, circuit boards, etc., for the proximity sensors 13 can be disposed inside the support member 12. In this embodiment, although a cylinder shape, which is a simple shape, is adopted for the support member 12, the shape thereof is not limited thereto, and it is also possible to adopt a member having another arbitrary simple shape, such as a solid bar-like member, a plate-like member, or a lattice-like member.

TOF sensors are shown as the proximity sensors 13. By adopting the TOF sensors, it is possible to measure the distances from the proximity sensors 13 to the object and to perform processing according to the distances. Instead of this, it is also possible to adopt proximity sensors 13 of another arbitrary type, such a capacitive type, an infrared type, an ultrasonic type, or an optical type.

Figure 7:
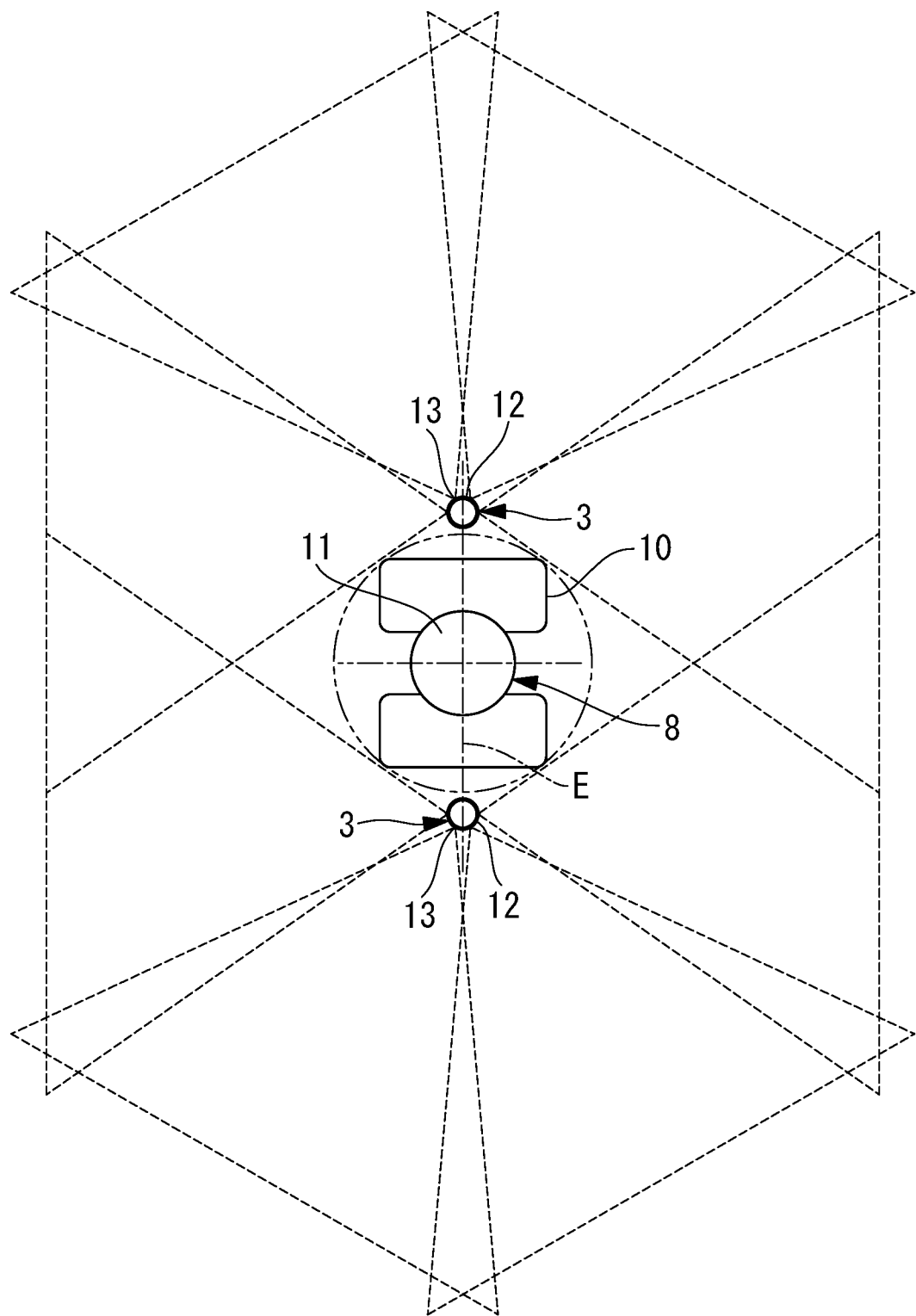
FIG. 7 is a front view for explaining the detection ranges of the proximity sensors in a modification of the robot shown in FIG. 1.

In this embodiment, although a description has been given of an example case in which the proximity sensor unit 3 is disposed at the position corresponding to the upper section of the second arm 7 at the origin position, the position thereof is not limited thereto. For example, as shown in FIG. 7, it is also possible to dispose support members 12 on both side surfaces of the second arm 7 at two places away from the second arm 7. By adopting this configuration, the detection ranges of the proximity sensors 13 are located all around the second arm 7 in the circumferential direction, thereby making it possible to detect, without omission, an object that approaches the second arm 7 and the wrist unit 8 from every direction. Support members 12 may also be provided at three or more places.

According to this embodiment, with the proximity sensor unit 3, which has a simple form, the approach of an object can be detected in a wide range extending across the second arm 7 and the wrist unit 8. In this case, any part of the robot body 2 or a tool mounted on the wrist unit 8 might enter the detection ranges, depending on the relationship between the first arm 6 and the second arm 7 or the rotation angle of the wrist unit 8 with respect to the second arm 7.

In order to prevent false detection in such a case, it is also possible that a control unit that is connected to the proximity sensors 13 is provided and that the control unit adjusts the detection ranges of the proximity sensors 13 in accordance with the operating angles of the respective axes of the robot body 2. The control unit is formed of a processor and a memory.

The robot 1 of this embodiment may include: a workspace setting means for setting, in advance, a workspace that an operator etc. enters; and an alarm unit. When the robot body 2 is operated, if there is a possibility that any part of the robot body 2 comes in contact with the workspace before the detection ranges of the proximity sensors 13 come in contact with the workspace, the alarm unit gives an alarm. The workspace setting means is formed of a processor and a memory.

The control device, which operates the robot body 2, may receive information on the distances to an approaching object from the proximity sensors 13 and adjust the speed for operating the robot body 2 in accordance with the magnitudes of the distances.

Figure 8:
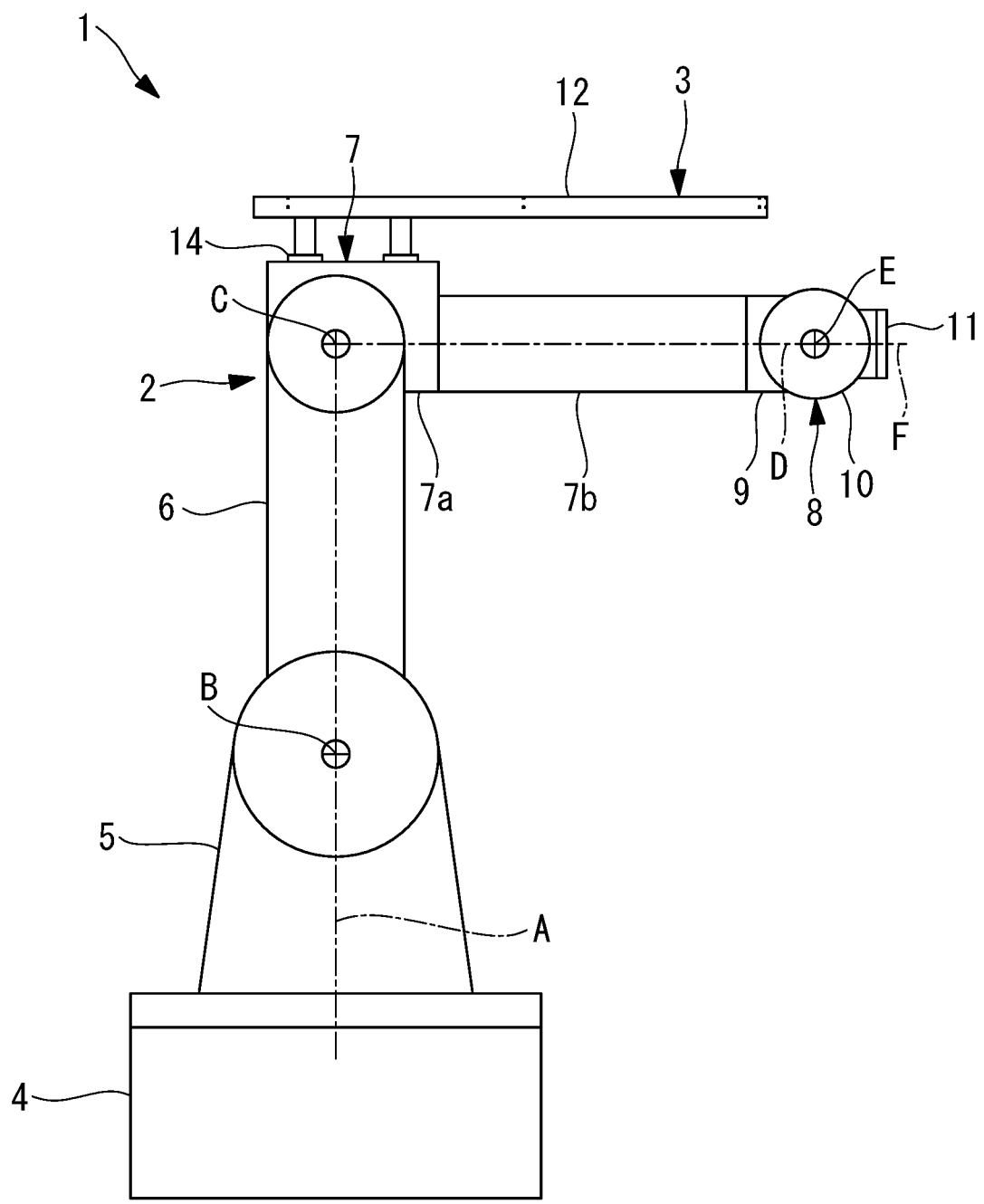
FIG. 8 is a side view showing another modification of the robot shown in FIG. 1.
Figure 9:
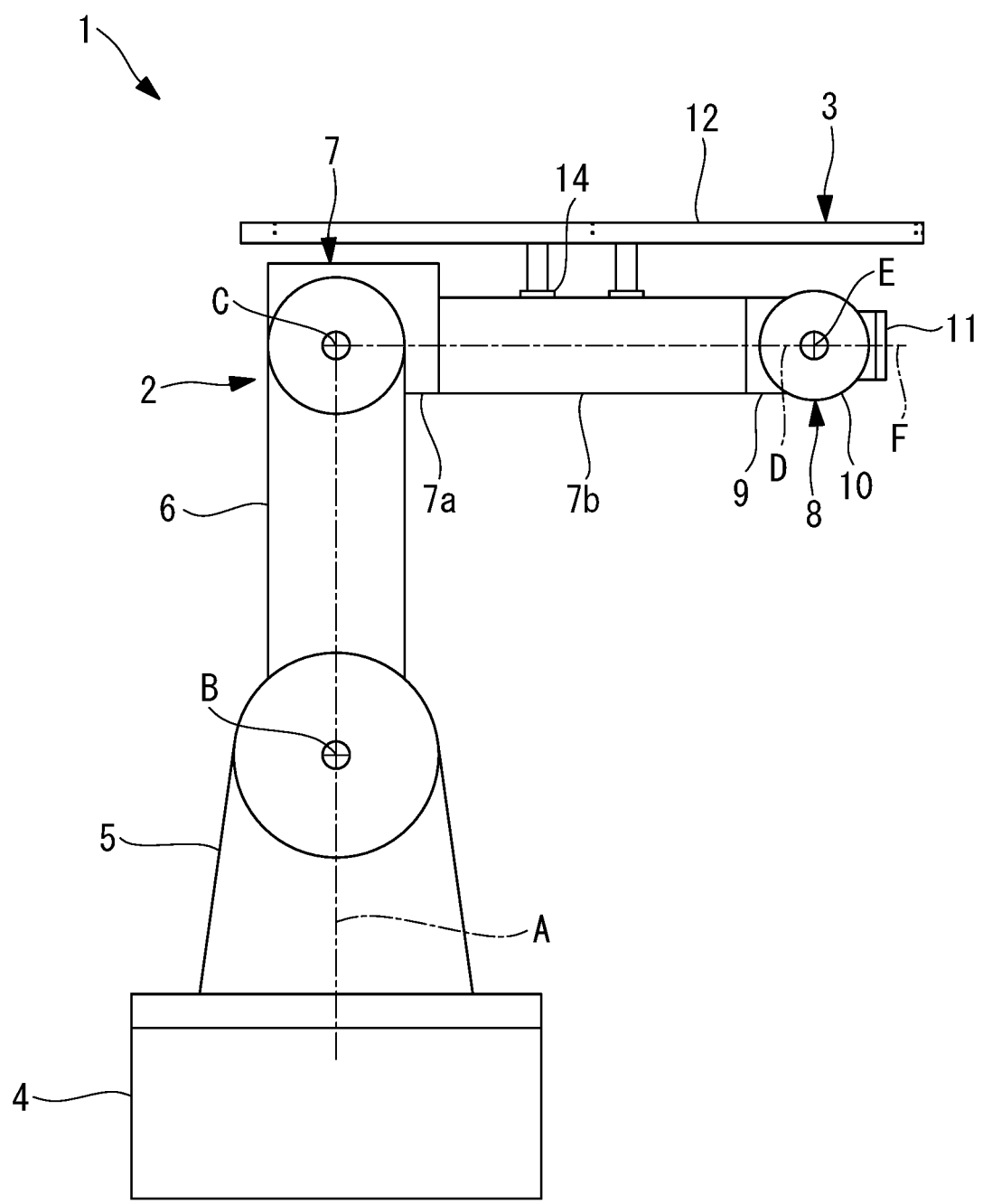
FIG. 9 is a side view showing still another modification of the robot shown in FIG. 1.

In this embodiment, although an arm that is supported at the distal end of the first arm 6 so as to be rotatable about the third axis C is adopted as the second arm 7, instead of this, as shown in FIG. 8, it is also possible to adopt an arm that is composed of: a first arm element 7a to which the support member 12 is fixed and that is supported at the distal end of the first arm 6 so as to be rotatable about the third axis C; and a second arm element 7b that is supported on the first arm element 7a so as to be rotatable about the longitudinal axis. As shown in FIG. 9, the support member 12 may also be fixed to the second arm element 7b instead of to the first arm element 7a.

Figure 10:
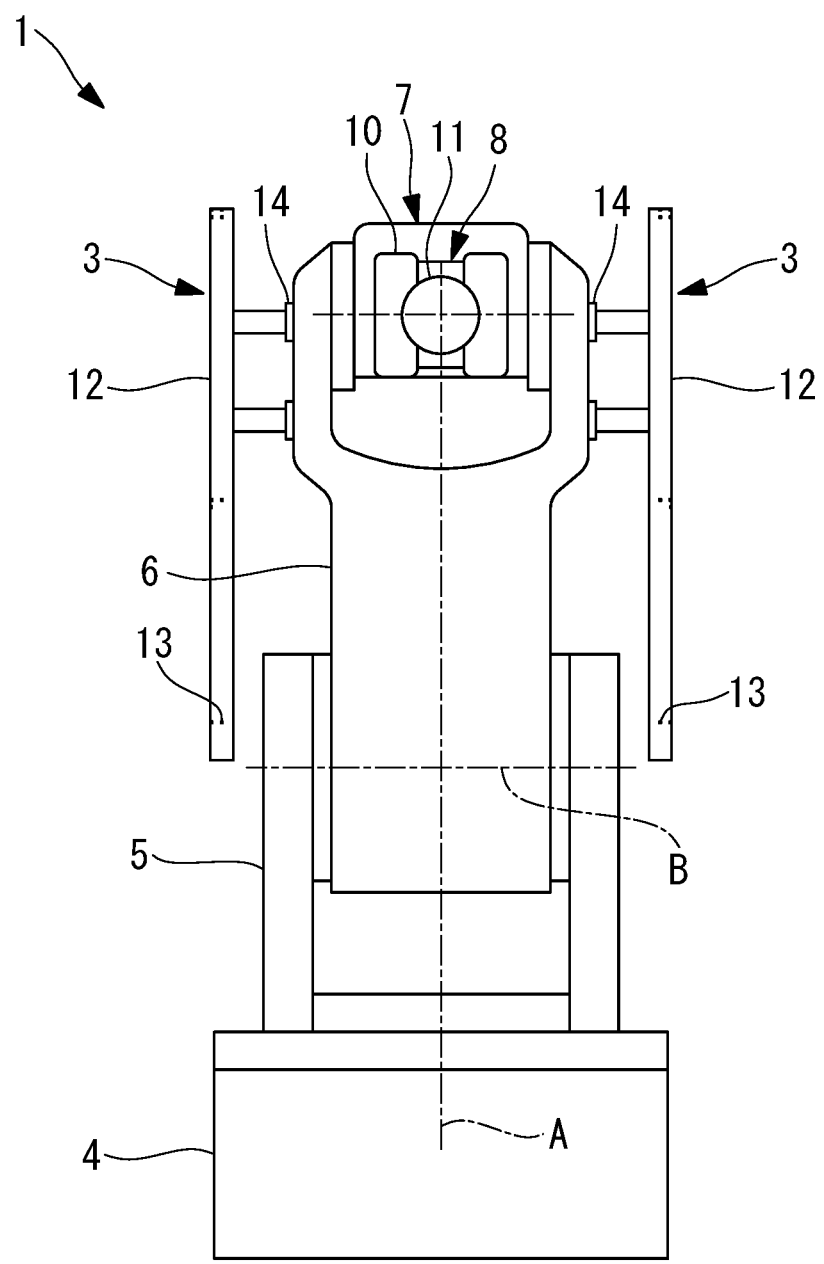
FIG. 10 is a front view showing still another modification of the robot shown in FIG. 1.

In this embodiment, although an example case in which detection is performed over areas around the second arm 7 and the wrist unit 8 as the detection ranges of the proximity sensors 13 is shown, instead of this, as shown in FIG. 10, detection may also be performed over areas around the first arm (another arm) 6 and the second arm 7. In this case, the support members 12 are disposed along the longitudinal axis of the first arm 6 away from the surfaces of the first arm 6 and the second arm 7 in the direction perpendicular to the longitudinal axis of the second arm 7, at such positions as to extend across the joint between the first arm 6 and the second arm 7.

Figure 11:
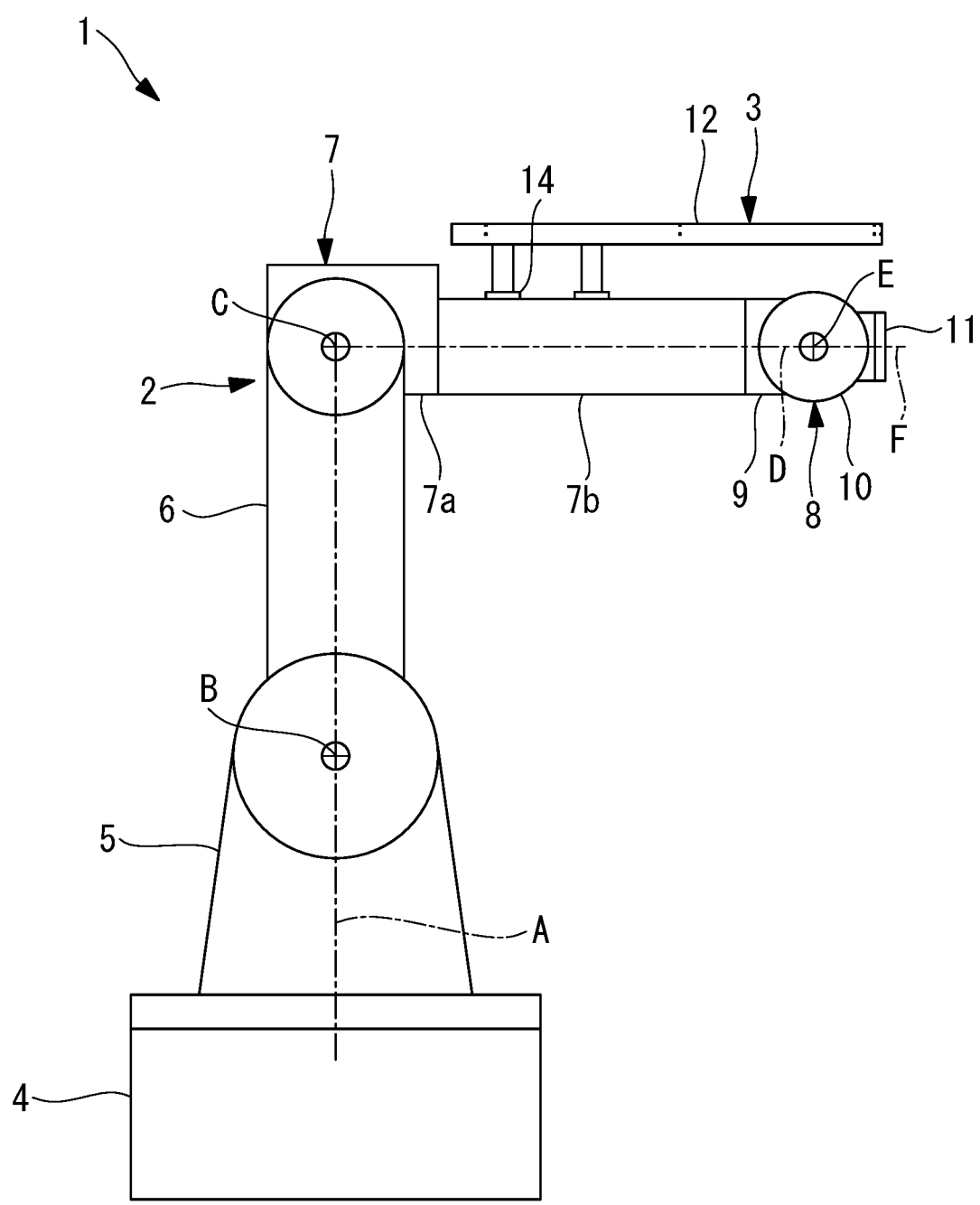
FIG. 11 is a side view showing still another modification of the robot shown in FIG. 1.

In this embodiment, although an example case in which the support member 12 is fixed to a base-end section of the second arm 7 is shown, instead of this, as shown in FIG. 11, the support member 12 may also be fixed to a distal-end section of the second arm 7. The support member 12 need not be disposed so as to extend across the total length of the second arm 7 and the wrist unit 8; it suffices to dispose the support member 12 so as to extend across the joint between the second arm 7 and the wrist unit 8 and to include the second arm 7 and the wrist unit 8 within the detection ranges of the proximity sensors 13, which are disposed on the support member 12.

The invention claimed is:

1. A robot comprising:
   a robot body that includes an arm having a longitudinal axis and at least one joint; and
   a proximity sensor unit that detects an object approaching the arm of the robot body, the proximity sensor unit further comprising:
      a support member that is fixed to the arm and that is disposed, at such a position as to extend across the joint, so as to be away from a surface of the arm in a direction perpendicular to the longitudinal axis, wherein the support member is a cylinder-like member, and
      a plurality of proximity sensors that are attached to the support member, wherein each sensor of the plurality of proximity sensors is disposed at regular intervals in both an axial direction and a circumferential direction of the cylinder-like member.

2. The robot according to claim 1, wherein the robot body comprises
   a wrist unit that is supported at a distal end of the arm; the proximity sensor unit detects an object approaching the arm and the wrist unit; and the support member is disposed, at such a position as to extend across a joint between the arm and the wrist unit, so as to be away from surfaces of the arm and the wrist unit in a direction perpendicular to the longitudinal axis.

3. The robot according to claim 1, wherein the robot body comprises
   another arm that supports, at a distal end of the other arm, the arm so as to be rotatable about a rotation axis; the proximity sensor unit detects an object approaching the arm and the other arm; and the support member is disposed, at such a position as to extend across a joint between the arm and the other arm, so as to be away from surfaces of the arm and the other arm in a direction perpendicular to the longitudinal axis.

4. The robot according to claim 1, wherein the support member is disposed at one place in the circumferential direction of the arm.

5. The robot according to claim 1, further comprising
   a plurality of support members disposed at a plurality of places at intervals in the circumferential direction of the arm.

6. The robot according to claim 5, wherein the plurality of support members are disposed at two places so as to sandwich the arm therebetween in a direction perpendicular to the longitudinal axis.

7. The robot according to claim 1, wherein the proximity sensors are TOF sensors.

8. The robot according to claim 1, further comprising
   a control unit that adjusts detection ranges of the proximity sensors, wherein the control unit adjusts the detection ranges of the proximity sensors in accordance with an operating angle of each axis of the robot body.

* * * * *